(12) United States Patent
Fakih

(10) Patent No.: US 10,018,378 B1
(45) Date of Patent: *Jul. 10, 2018

(54) SOLAR THERMAL LAMPS AND GLOBES FOR HEATING WATER IN A WATER TANK

(71) Applicant: Ali A. Fakih, Littleton, CO (US)

(72) Inventor: Ali A. Fakih, Littleton, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/202,510

(22) Filed: Jul. 5, 2016

Related U.S. Application Data

(62) Division of application No. 14/049,309, filed on Oct. 9, 2013, now Pat. No. 9,400,121.

(51) Int. Cl.
*F24J 2/32* (2006.01)
*F24J 2/34* (2006.01)

(52) U.S. Cl.
CPC .................................... *F24J 2/345* (2013.01)

(58) Field of Classification Search
USPC ....... 126/600, 635, 640, 641, 645, 655, 657, 126/688–695, 698
See application file for complete search history.

(56) References Cited

U.S. PATENT DOCUMENTS

| | | | | |
|---|---|---|---|---|
| 4,299,203 A * | 11/1981 | Skopp | ..................... | F24J 2/055 126/569 |
| 4,505,261 A * | 3/1985 | Hunter | ..................... | F24J 2/32 126/588 |
| 4,637,374 A * | 1/1987 | Arai | ..................... | C23C 8/02 126/569 |
| 9,400,121 B2 * | 7/2016 | Fakih | ..................... | F24J 2/32 |

* cited by examiner

*Primary Examiner* — Vivek Shirsat
(74) *Attorney, Agent, or Firm* — Edwin H. Crabtree; Rama L. Pizamo

(57) ABSTRACT

A solar thermal lamp used for heating water inside a tank. The thermal lamp includes a transparent glass bulb with a threaded male coupling for attaching to a female coupling in the tank. The lamp also includes a heat tube with an enlarged water heating condenser. The condenser is received inside the tank. The heat tube can include a copper coil, copper fins, a glass coil, a copper lamp, a glass lamp, and the like for receiving solar energy and conducting the heat to the heating condenser for heating the water inside the tank. Also, the invention can be in the form of a solar thermal globe. The solar globe is self-contained and includes a water tank. Another embodiment of the globe tracks with the daily movement of the sun and change with seasons.

18 Claims, 4 Drawing Sheets

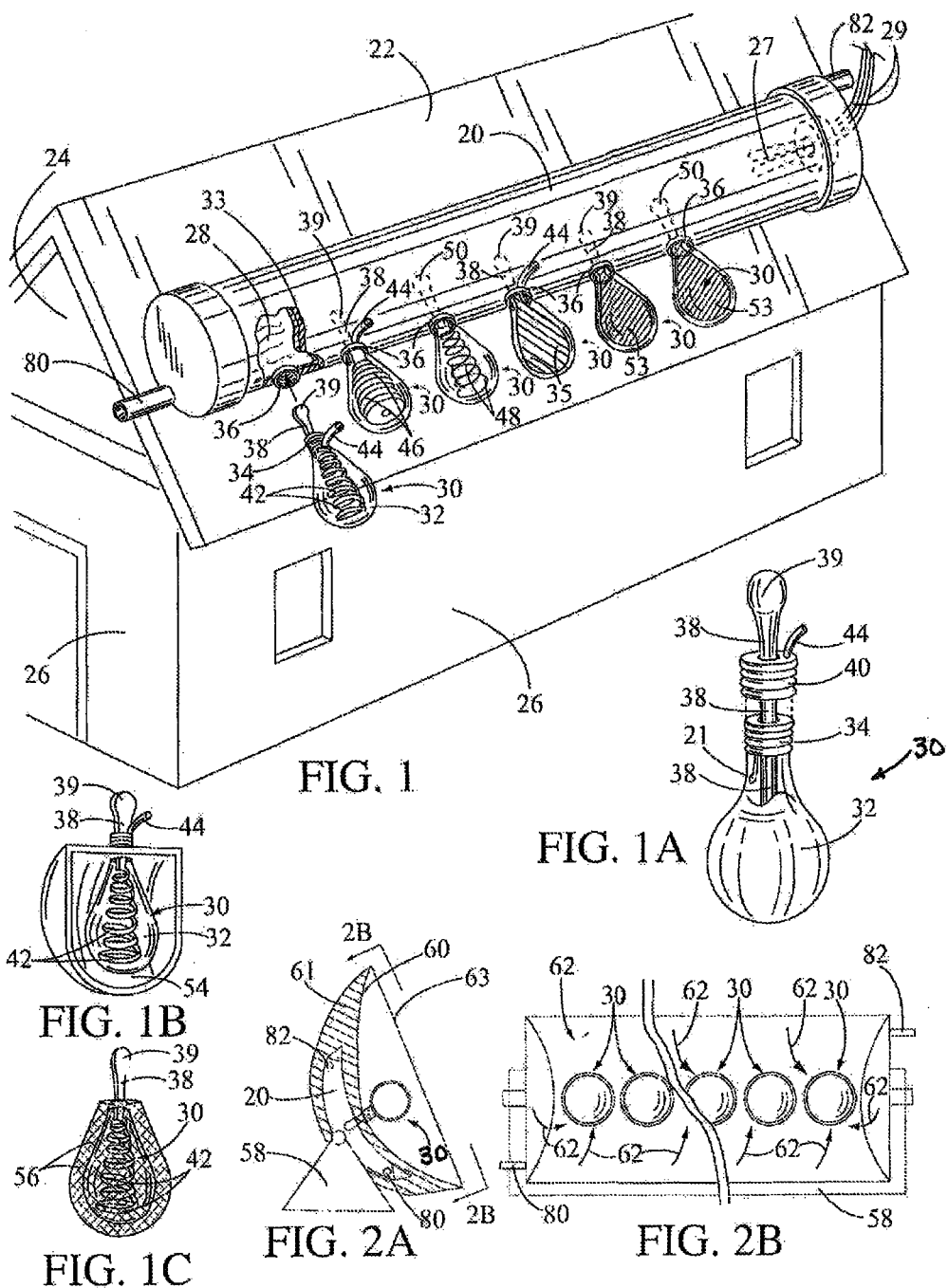

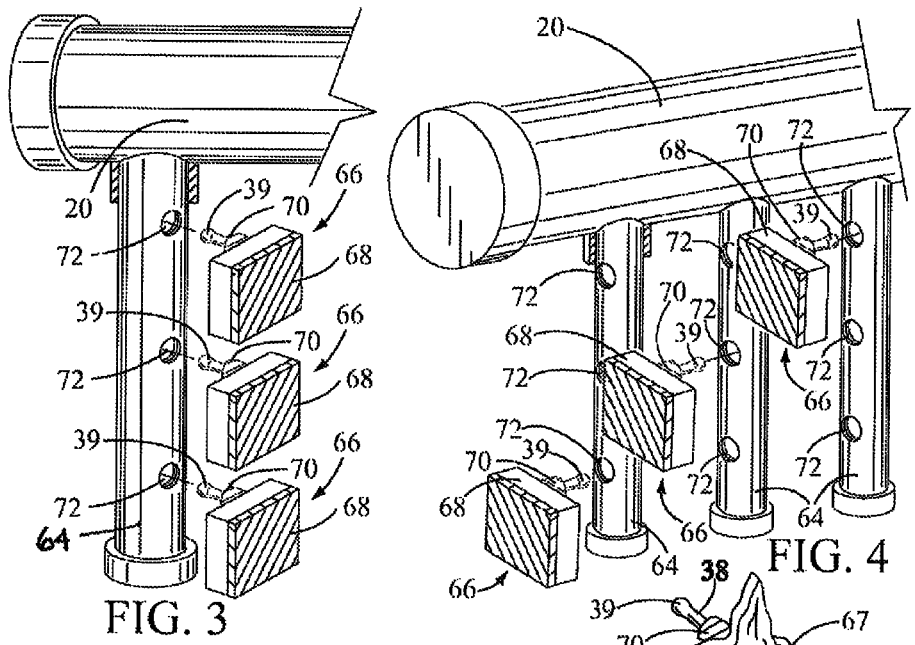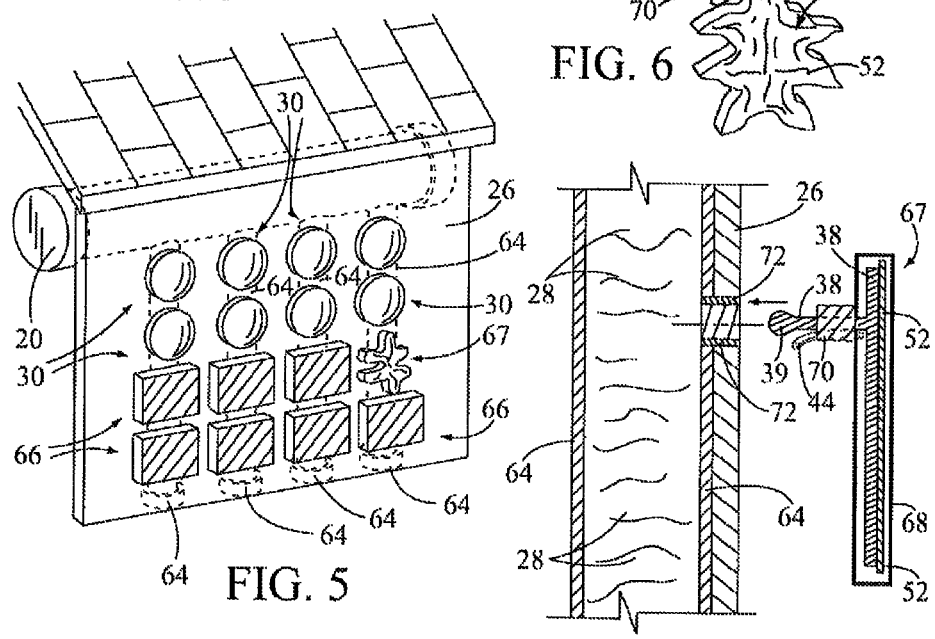

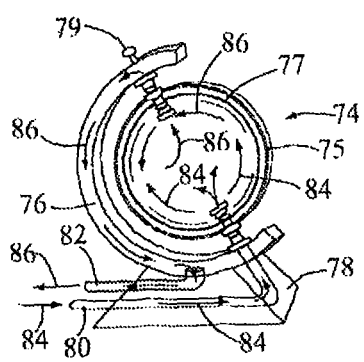 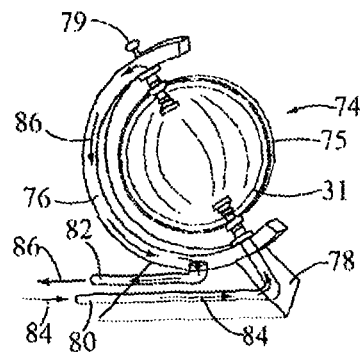
FIG. 8  FIG. 9
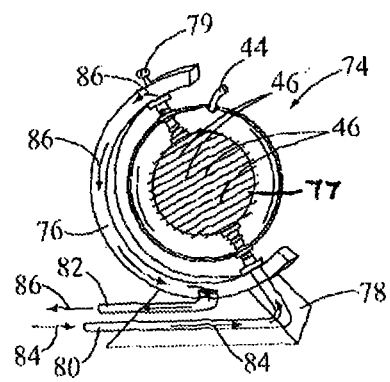 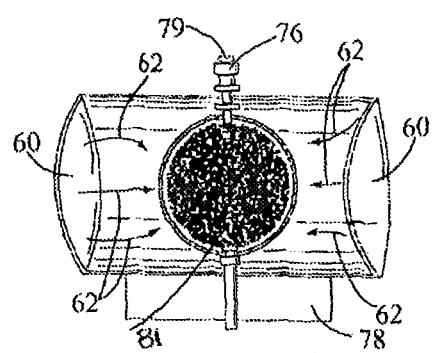
FIG. 10  FIG. 11

SOLAR THERMAL LAMPS AND GLOBES FOR HEATING WATER IN A WATER TANK

This application is a continuation patent application based on a non-provisional patent application having a Ser. No. 14/049,309, filed on Oct. 9, 2013, by the subject inventor and having a title of "SOLAR THERMAL LAMPS AND GLOBES FOR HEATING WATER IN A WATER TANK.

BACKGROUND OF THE INVENTION

(a) Field of the Invention

This invention relates to solar thermal lamps and globes, and more particularly, but not by way of limitation, to solar thermal lamps are solar energy collectors for heating water in a water tank or heat exchanger, heating spaces and used for air conditioning and that are easy to replace and maintain as a solar collector system. The lamps can be installed on building walls, poles and similar applications. Also, the solar system can be installed facing south on flat and pitched roofs and on the ground. Further, the solar thermal lamps can be installed on residential, commercial and industrial buildings and as decorative fixtures by architects.

SUMMARY OF THE INVENTION

In view of the foregoing, it is a primary objective of the subject invention to provide solar thermal lamps and globes of the followings:

The subject invention, in one embodiment, includes a thermal lamp having a transparent glass bulb with a threaded male coupling for attaching to a female coupling in the bottom or side of a water tank or heat exchanger. The thermal lamp also includes a metal condenser attached to a heat tube. The condenser is filed with a fluid or gas for heat transfer. The condenser is received inside the water tank. The heat tube attached to the condenser and to a copper coil, copper fins, copper lamp or the condenser is attached to a glass coil or a glass lamp coated solar absorbing material, and the like for receiving solar energy thereon and transfer it to heat in the condenser for heating the water inside the water tank.

The thermal lamps are self supporting and there is no need for additional expense for structural and labor costs.

Another object of the invention is placing the lamps of any shapes and sizes on the south walls of a residential, commercial and industrial building or using the lamps as a solar wall and provide a good decoration by architects.

The object of the invention is the solar thermal globes having their own water tanks and without the need of electricity to transfer hot water to a hot water tank.

Still another object of the invention is the solar thermal globe can track the sun all the times of the year and without the need of water hoses and seals and related maintenance problems.

Yet another object of the invention is the lamps and globes can be built with single, double and triple glass with vacuum between glass for minimizing heat loss, when collecting solar energy.

Further, the lamps can include fins and tubes and the globe can include fins attached thereto for increasing the surface area exposed to the sun and creating higher temperature systems.

These and other objects of the present invention will become apparent to those familiar with solar collectors and more specifically solar thermal lamps and globes when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the subject solar thermal lamps and globes and in which:

FIG. 1 illustrates a perspective view of a heat exchanger or hot water tank mounted on a roof top. Attached to the water tank are a series of different types of solar thermal lamps attached to the bottom or side of the water tank.

FIG. 1A is an enlarged perspective view of the solar thermal lamp with the options as described as shown in FIG. 1.

FIG. 1B illustrates a solar thermal lamp with solar sun reflector.

FIG. 1C illustrates the solar thermal lamp with protective metal guard.

FIG. 2A shows a side view of a bank of thermal lamps mounted on an elongated hot water tank including sun reflector mounted on a floor base.

FIG. 2B illustrates a front view of the bank of thermal lamps, as shown in FIG. 2A.

FIG. 3 shows a perspective view of a horizontal water tank with a downwardly extending, vertical water pipe having three thermal lamps adapted from receipt thereon using a twist-lock thread. These lamp shape have the same embodiment as of lamp 30.

FIG. 4 illustrates a perspective view of the horizontal water tank having three downwardly extending, vertical water pipes adapted for mounting different types of thermal lamps thereon. This configuration is used when installing the thermal lamps in solar panel or used as a solar wall as shown in FIG. 5.

FIG. 5 illustrates a perspective view of a solar building wall and roof with a plurality of thermal lamps mounted on the wall and attached to the water pipes. The water pipes are disposed inside the building and behind the wall.

FIG. 6 is an enlarged perspective view of a thermal lamp in the shape of a leaf having a dark, absorbing coating on the surface of the lamp. Any shapes and sizes could be used in this configuration.

FIG. 7 illustrates an enlarged sectional view of a portion of the solar wall, shown in FIG. 5, and having a thermal lamp mounted thereon with a water heat condenser extending into the water pipe for heating hot water therein.

FIG. 8 shows a perspective view of a solar thermal globe mounted on a base and connected to a cold water pipe for heating the cold water inside the copper sphere which is coated solar absorbing material and exiting to the hot water pipe for domestic use.

FIG. 9 is another perspective view of the thermal globe having glass sphere coated solar absorbing material for circulating the cold water therein and heating the water prior to exiting out a hot water pipe.

FIG. 10 is similar to the thermal globe shown in FIG. 8 and having copper fins attached on the top of the copper sphere for maximizing the surface area exposed to the sun and heating the cold water inside the copper sphere.

FIG. 11 illustrates the thermal globe having a dark, absorbing coating for heating the cold water circulated therein and a sun reflector surround the globe for adding additional solar rays to the globe.

DETAILED DESCRIPTION OF THE PREFERRED EMBODIMENTS

Figures 12, 13:
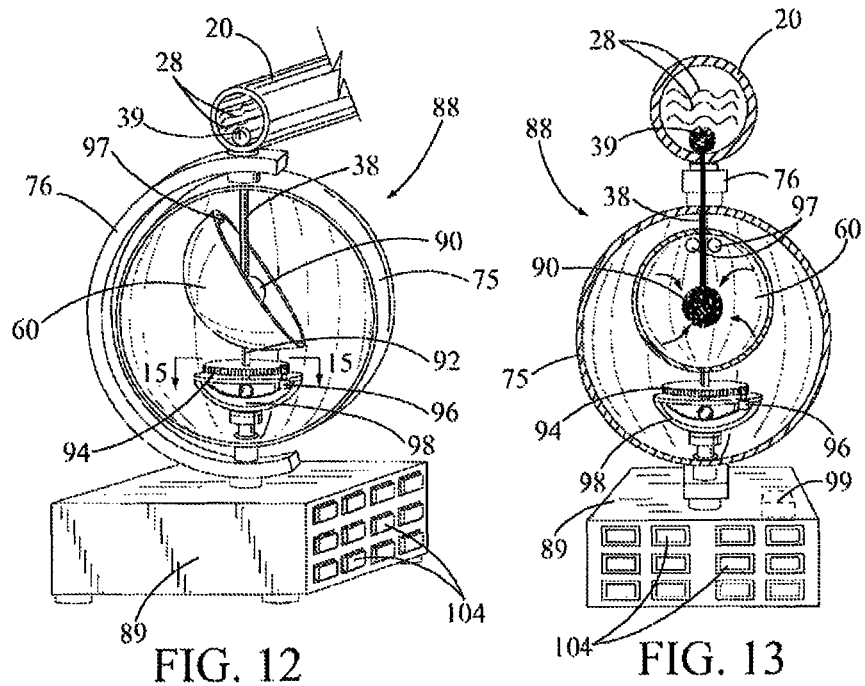
FIG. 12 is a perspective view of a clear glass globe with a metal heat condenser, heat tube, solar absorbing ball and a sun dish reflector mounted therein and connected to a hot water tank with the options of connecting to heat exchanger, cooker or steam generator. The globe is mounted on a globe base having solar cells panel mounted thereon.
FIG. 13 is a front view of the glass globe with condenser, heat tube and solar absorbing ball and heat reflector, as shown in FIG. 12.

In FIG. 1, a perspective view of a heat exchanger or hot water tank 20 is shown mounted on a roof top 22 of a building 24. The tank 20 includes insulation therearound 33. The building includes walls 26. The reflective roof top 22 and water tank 20 are shown facing the sun for absorbing solar energy. In this drawing, a series of different types of solar thermal lamps, having different unique features for collecting solar energy, are shown attached to a bottom or a side of the water tank 20. A portion of the left hand side of the water tank 20 has been cut away to illustrate water 28 stored therein for being heated by the thermal lamps using solar energy. The tank 20 can also include a hot water heater 27, shown in dashed lines, with electric leads 29. The heater 27 is used for heating water during inclement weather. The hot water tank or heat exchanger 20 also have a cold water inlet 80 and a hot water outlet 82.

On the left side of the tank 20 is a thermal lamp, having general reference numeral 30. The thermal lamp 30 includes a single wall, transparent glass bulb 32 with a threaded male coupling 34 and is shown positioned for attachment to a threaded female coupling 36 in the side of the tank 20. The lamp 30 is also shown enlarged in FIG. 1A. The lamp 30 includes a copper, or similar conductive metal, heat tube 38. The tube 38 includes an enlarged water heating condenser 39 received inside the tank for heating the water. The tube 38 further includes a treaded metal housing 40 and connected to the condenser 39 and screwed to the top of the threaded male coupling 34. Still further, the tube 38 includes a downwardly extending to copper coil 42 attached to the metal housing 40 and received inside the single glass bulb 32. The copper coil 42 is coated with a solar absorbing material and is used for absorbing solar energy and transferring it to the water heating condenser 39 for heating the water 28 inside the tank 20. Also, the lamp 30 can include a vacuum tube 44 for drawing a vacuum inside the glass bulb 32 for minimizing the heat loss in the lamp.

Also shown in this drawing is another thermal lamp 30 attached to the water tank 20 and including the heat tube 38 having attached copper fins 46 with a coated solar absorbing material. Further, another lamp 30 can include a glass coil 48 with a coated solar absorbing material attached to a glass condenser 50 with a vacuum between the glass coil 48 and the outer glass bulb 32. Still further, the lamp 30 can include a copper lamp 35 with a coated solar absorbing material and attached to a copper condenser 39 and vacuum between the copper lamp 35 and the outer glass bulb 32. Even further, the lamp 30 can include a glass lamp 53 coated solar absorbing material and attached to a copper heat tube 38 extended inside the lamp and attached to the copper condenser 39 and a vacuum between two glass layers of the bulb. Still further, the lamp 30 can include the glass lamp 53 with coated solar absorbing material attached to the glass condenser 50 and a vacuum between two glass layers of the bulb. The first four lamps, shown in the drawing, can have single double or triple glass with vacuum between glass layers, the last two lamps can have double or triple glass layer with vacuum between glass layers to minimize the heat loss in the lamps.

It can be appreciated by viewing this drawings and the different embodiments of the thermal lamps 30 mounted on the hot water tank 20, various combinations of different sizes, shapes and designs of the thermal lamps with glass bulbs, metal and glass water heating probes and metal and glass coils can be anticipated for the effective use of capturing solar energy and heating the water inside the water tank.

In FIG. 1A is enlargement view of lamp 30. with a Baruim 21.

In FIG. 1B, the solar thermal lamp 30 is shown mounted inside a solar sun reflector 54 for increasing the reflection of sun rays on the glass bulb 32.

In FIG. 1 C, the solar thermal lamp 30 is shown with a protective metal guard 56.

In FIG. 2A, a side view of a bank of the thermal lamps 30 is shown mounted on an elongated hot water tank 20 with insulation 61 and mounted on a rotatable, floor or roof base 58 for latitude correction. The roof base 58 includes an elongated solar heat reflector 60 and a glass cover or fresnel lens 63. As you see in this configuration the solar panel is self contained and includes the solar collector with the lamps, the reflector and the hot water tank all in one unit In FIG. 2B, a front view of the bank of thermal lamps 30, as shown in FIG. 2A, is illustrated with arrows 62 illustrating the reflection of sun rays toward the lamps 30 and providing an increased concentration of solar rays on the lamps. A cold water pipe 80 and hot water pipe 82 are shown extending outwardly from opposite ends of the water tank 20.

In FIG. 3, a perspective view of the horizontal water tank 20 is shown and with a downwardly extending, vertical water pipe 64 and having square-shaped thermal lamps, having general reference numeral 66, with square-shaped transparent glass 68. The thermal lamps 66, in this embodiment, also include metal heat tube 38 with heat condenser 39 and a male thread 70. The thread 70 is adapted for receipt through a female thread 72. The male thread 70 includes twist-lock threads, which are received through openings in the side of the female thread 72. Therefore, by merely twisting the male thread 70 a few degrees, the metal heat condenser 39 is secured inside the water pipe 64 for heating the water inside the water pipe 64. This type of threaded coupling is used when the thermal lamps 66, by the nature of their angular shape, have limited coupling movement, when the lamps are mounted next to each other as shown in FIG. 5.

In FIG. 4, a perspective view of the horizontal water tank 20 is shown having three downwardly extending, vertical water pipes 64 adapted for mounting the square-shaped thermal lamps 66 thereon. This option is used for solar panels or solar walls as shown in FIG. 5.

In FIG. 5, a perspective view of the building wall 26 is shown with a plurality of the bulb-shaped, thermal lamps 30, the square-shaped thermal lamps 66 and a leaf shape lamp 67 mounted next to the wall 26 and coupled to the water pipes 64. The water pipes 64 are disposed behind the wall 26.

In FIG. 6, an enlarged perspective view of the thermal lamp 67 in the shape of a leaf design is shown and having the dark, absorbing coating 52 on the surface of the lamp.

In FIG. 7, an enlarged sectional view of a portion of the wall 26 is shown and having one of the metal heat condensers 39 attached to a twist-lock thread 70 of one of the thermal lamps 67 ready to be received through a hole in the wall and coupled through the female thread 72 to the side of the vertical water pipe 64 for heating water 28 therein. In this drawing, the tube 38 is attached to a copper plate shaped as a leaf with the coated solar absorbing material 52 and received inside the transparent, leaf-shaped glass cover 68. A vacuum tube 44 is shown in this drawing to draw a vacuum inside the lamp to minimize the heat loss in the lamp. Any shapes and sizes could be used in this embodiment.

In FIG. 8, a perspective view of a transparent glass solar thermal globe, having a general reference numeral 74 is shown. The globe 74 includes a transparent glass cover 75, which is mounted on a hollow, "U" shaped bracket 76 and attached to a top of a globe base 78. The globe base 78 is used for receiving the cold water pipe 80 and the hot water pipe 82. The cold water, shown as arrows 84, enters inside the copper sphere, which is coated with solar absorbing material and heated therein. The hot water, shown as arrows 86, exits out the top of the globe 74, through the hollow bracket 76, and into the hot water pipe 82. A pressure relief valve 79 in activated and release pressure when temperature of the water in the top of the globe exceeds the boiling temperature.

In FIG. 9, another perspective view of the thermal globe 74 is shown. In this embodiment, the cold water 84. is circulated through the glass sphere with coated solar absorbing material from an outside 31 of the globe to the inside the globe for heating the cold water 84 and discharging the hot water 86 to the hot water pipe 82.

In FIG. 10, another embodiment of the thermal globe 74 is shown. In this example, the copper fins 46 with the coated solar absorbing material are attached to a copper sphere 77 for maximizing the surface area exposed to the sun. This feature is used for heating the cold water 84 and is similar to the thermal globe shown in FIG. 8.

In FIG. 11, a front view of the thermal globe 74 is shown having a dark, absorbing coating 81 for heating the cold water circulated therein. Also, the heat reflector 60 is shown surrounding the globe 74 for adding additional solar rays, shown as arrows 62, onto the coating 77.

The thermal globe 74 does not need a hot water tank or heat exchanger and therefore there is no need for electricity to transfer the hot water to a hot water tank. Also, a vacuum can be used inside the globe 74 to minimize the heat loss in the globe. All the lamps and all the globes have a Barium used for a vacuum check.

In FIG. 12, a perspective view of another embodiment of the solar thermal globe is illustrated and having general reference numeral 88. In this drawing, the thermal globe 88 includes the transparent glass globe cover 75 mounted on the "U" shaped bracket 76 received on top of the a globe base 89. with solar cells 104. The water tank 20 is shown disposed above the globe 88 for heating the water 28 therein. The thermal globe 88 includes the metal heat tube 38 with the enlarged water heating condenser 39, shown received inside the water tank 20 or other options not shown in this drawing as a cooker or steam generator or all the three options all together could be tied all together and could be used for cooking, heating water or generate electricity for domestic used. The tube 38 also includes a solar energy adsorbing ball 90 surrounded by the sun dish reflector 60. The dish reflector 60 is mounted on top of a rotatable drive shaft 92. The drive shaft 92 is attached to a first drive gear 94 with a first drive motor 96 mounted on a gear housing 98. The gear housing 98 is attached to the bottom of the globe cover 75.

The sun sensor 97 senses the position of the sun and sends a signal to a microprocessor 99. which engages and operates the motor 96 and rotate the gear 94 and attached drive shaft 92 to rotate the dish reflector 60 toward the sun during the day. Also, the sensor 97 senses the position of the sun and sends a signal to the microprocessor 99 to engage and operate the motor 100, which rotates on the drive gear 102. The drive gear 102 rotates the attached drive shaft 92 and in turn rotates the dish reflector 60 toward the sun during the change in yearly seasons. The most important aspect of this embodiment is the solar absorbing ball is fixed in position and there is no need for hoses and seals and related maintenance problems.

In FIG. 13, a front sectional view of the globe 88 and the globe cover 75 are shown with the heat absorbing ball 90 centered inside the dish reflector 60 for receiving the reflected sun rays thereon.

Figures 14, 15:
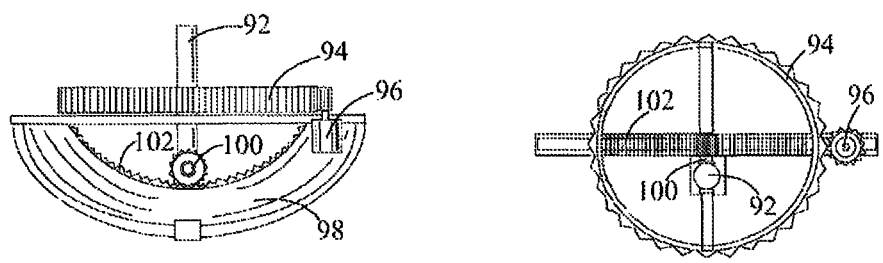
FIG. 14 is an enlarged view of a pair of motors and a pair of gear trains used to rotate the sun reflector with the angle of the sun during the day and during changes in the yearly seasons.
FIG. 15 is a top view of the motors and gear trains, shown along lines 15-15 in FIG. 12.

In FIG. 14, an enlarged view of the drive motors 96 and 100 and the drive gears 94 and 102 is shown and used to rotate the sun reflector 60 with the angle of the sun during the day and during yearly seasons.

In FIG. 15, a top view of the drive motors 96 and 100 and the drive gears 94 and 102 is shown and taken along lines 15-15 in FIG. 12.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which an exclusive privilege and property right are claimed are defined as follows:

1. A solar panel for heating water, the solar panel comprising:

a combination insulated water tank and solar heat reflector, the water tank and heat reflector adapted for mounting on a building roof, a building wall or similar structure, the water tank incorporated inside the heat reflector and adapted for storing water therein, the heat reflector having a concave portion therein;

a plurality of spaced apart threaded female couplings disposed in a side of the water tank and next to the concave portion of the heat reflector;

a plurality of transparent glass bulbs spaced apart and mounted along a length of the combination water tank and solar heat reflector for absorbing increased amounts of solar energy and heating of the water in the water tank wherein the plurality of glass bulbs are mounted to the same solar heat reflector;

a plurality of threaded male couplings, the male couplings mounted on one end of the glass bulbs, the male couplings threadably attached to the female couplings, the male and female couplings provide for self-supporting the glass bulbs on the combination water tank and the heat reflector, and a heat tube mounted inside the glass bulbs, the tube having an enlarged water heating condenser, the condenser filled with a fluid for heat transfer, the condenser extending outwardly from the male couplings and disposed inside the water tank, the tube having copper fins with a coated solar absorbing material for absorbing solar energy inside the bulbs, the tube connected to the condenser for heating the condenser, the concave portion of the heat reflector disposed around the back of and the sides of the glass bulbs for reflecting solar heat onto the copper fins, the condenser adapted for heating the water in the water tank.

2. The panel as described in claim 1 further including a vacuum tube in the glass bulbs, the vacuum tube for drawing a vacuum therein and minimizing heat loss in the glass bulbs.

3. The panel as described in claim 1 wherein the male couplings have a male twist-lock thread and the female couplings have a female twist-lock thread.

4. The panel as described in claim 1 further including a glass cover for receipt over the solar heat reflector.

5. The panel as described in claim 1 further including a fresnel lens for receipt over the solar heat reflector.

6. The panel as described in claim 1 further including a rotatable base attached to the combination water tank and solar heat reflector, the rotatable base for latitude correction of the tank and reflector.

7. A solar panel for heating water, the solar panel comprising:
a combination insulated water tank and solar heat reflector, the water tank and heat reflector adapted for mounting on a building roof, a building wall or similar structure, the water tank incorporated inside the heat reflector and adapted for storing water therein, the heat reflector having a concave portion therein;
a plurality of spaced apart threaded female couplings disposed in a side of the water tank and next to the concave portion of the heat reflector;
a plurality of transparent glass bulbs spaced apart and mounted along a length of the combination water tank and solar heat reflector for absorbing increased amounts of solar energy and heating of the water in the water tank wherein the plurality of glass bulbs are mounted to the same solar heat reflector;
a plurality of threaded male couplings, the male couplings mounted on one end of the glass bulbs, the male couplings threadably attached to the female couplings, the male and female couplings provide for self-supporting the glass bulbs on the combination water tank and the heat reflector; and
a heat tube mounted inside the glass bulbs, the tube having an enlarged water heating condenser, the condenser filled with a fluid for heat transfer, the condenser extending outwardly from the male couplings and disposed inside the water tank, the tube having a copper lamp with a coated solar absorbing material for absorbing solar energy inside the bulbs, the tube connected to the condenser for heating the condenser, the concave portion of the heat reflector disposed around the back of and the sides of the glass bulbs for reflecting solar heat onto the copper lamp, the condenser adapted for heating the water in the water tank.

8. The panel as described in claim 7 further including a vacuum tube in the glass bulbs, the vacuum tube for drawing a vacuum therein and minimizing heat loss in the glass bulbs.

9. The panel as described in claim 7 wherein the male couplings have a male twist-lock thread and the female couplings have a female twist-lock thread.

10. The panel as described in claim 7 further including a glass cover for receipt over the solar heat reflector.

11. The panel as described in claim 7 further including a fresnel lens for receipt over the solar heat reflector.

12. The pane as described in claim 7 further including a rotatable base attached to the combination water tank and solar heat reflector, the rotatable base for latitude correction of the tank and reflector.

13. A solar panel for heating water, the solar panel comprising:
a combination insulated water tank and solar heat reflector, the water tank and heat reflector adapted for mounting on a building roof, a building wall or similar structure, the water tank incorporated inside the heat reflector and adapted for storing water therein, the heat reflector having a concave portion therein;
a plurality of spaced apart threaded female couplings disposed in a side of the water tank and next to the concave portion of the heat reflector;
a plurality of transparent glass bulbs spaced apart and mounted along a length of the combination water tank and solar heat reflector for absorbing increased amounts of solar energy and heating of the water in the water tank wherein the plurality of glass bulbs are mounted to the same solar heat reflector;
a plurality of threaded male couplings, the male couplings mounted on one end of the glass bulbs, the male couplings threadably attached to the female couplings, the male and female couplings provide for self-supporting the glass bulbs on the combination water tank and the heat reflector; and
a heat tube mounted inside the glass bulbs, the tube having an enlarged water heating condenser, the condenser filled with a fluid for heat transfer, the condenser extending outwardly from the male couplings and disposed inside the water tank, the tube having a glass lamp with a coated solar absorbing material for absorbing solar energy inside the bulbs, the tube connected to the condenser for heating the condenser, the concave-portion of the heat reflector disposed around the back of and the sides of the glass bulbs for reflecting solar heat onto the glass bulbs, the condenser adapted for heating the water in the water tank.

14. The panel as described in claim 13 further including a vacuum tube in the glass bulbs, the vacuum tube for drawing a vacuum therein and minimizing heat loss in the glass bulbs.

15. The panel as described in claim 13 wherein the male couplings have a male twist-lock thread and the female couplings have a female twist-lock thread.

16. The panel as described in claim 13 further including a glass cover for receipt over the solar heat reflector.

17. The panel as described in claim 13 further including a fresnel lens for receipt over the solar heat reflector.

18. The panel as described in claim 13 further including a rotatable base attached to the combination water tank and solar heat reflector, the rotatable base for latitude correction of the tank and reflector.

* * * * *